United States Patent
Ueno (10) Patent No.: US 11,598,693 B2
(45) Date of Patent: Mar. 7, 2023

(54) INFORMATION PROCESSING APPARATUS, INFORMATION PROCESSING METHOD, AND NON-TRANSITORY COMPUTER READABLE MEDIUM

(71) Applicant: KABUSHIKI KAISHA TOSHIBA, Tokyo (JP)

(72) Inventor: Ken Ueno, Tachikawa Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 269 days.

(21) Appl. No.: 17/015,339

(22) Filed: Sep. 9, 2020

(65) Prior Publication Data
US 2021/0263896 A1 Aug. 26, 2021

(30) Foreign Application Priority Data
Feb. 21, 2020 (JP) .............................. JP2020-028462

(51) Int. Cl.
G06F 11/30 (2006.01)
G01M 13/00 (2019.01)
G01M 99/00 (2011.01)

(52) U.S. Cl.
CPC .......... *G01M 13/00* (2013.01); *G01M 99/005* (2013.01)

(58) Field of Classification Search
CPC .................................................. G01M 13/00
See application file for complete search history.

(56) References Cited

U.S. PATENT DOCUMENTS

| 6,556,925 B1 * | 4/2003 | Mori .................. G01N 3/58 702/81 |
| 2014/0195184 A1 | 7/2014 | Maeda et al. |
| 2019/0324070 A1 | 10/2019 | Saneyoshi et al. |

FOREIGN PATENT DOCUMENTS

| JP | 2001-157949 A | 6/2001 | |
| JP | 2007-65883 A | 3/2007 | |
| JP | 2014-115714 A | 6/2014 | |
| WO | WO 2013/024613 A1 | 2/2013 | |
| WO | WO 2018/101363 A1 | 6/2018 | |
| WO | WO-2018101363 A1 * | 6/2018 | ............. G01R 21/00 |
| WO | WO-2018244203 A1 * | 12/2019 | ........... G01M 99/005 |
| WO | WO-2019244203 A1 * | 12/2019 | ........... G01M 99/005 |

\* cited by examiner

*Primary Examiner* — Phuong Huynh
(74) *Attorney, Agent, or Firm* — Finnegan, Henderson, Farabow, Garrett & Dunner, LLP (57) ABSTRACT

One embodiment of the present invention provides an apparatus and the like for improving the accuracy of deterioration estimation regarding a monitoring target. An information processing apparatus as one embodiment of the present invention includes a detector, a separator, a calculator, and an estimator. The detector detects a normal waveform pattern included in a waveform of time-series data of a target. The separator separates the waveform of the time-series data into components while removing the normal waveform pattern that is detected. The calculator calculates a feature of the time-series data based on at least one of the components. The estimator estimates deterioration of the target based on the feature.

9 Claims, 7 Drawing Sheets

INFORMATION PROCESSING APPARATUS, INFORMATION PROCESSING METHOD, AND NON-TRANSITORY COMPUTER READABLE MEDIUM

CROSS-REFERENCE TO RELATED APPLICATION (S)

This application is based upon and claims the benefit of priority from Japanese Patent Application No. 2020-028462, filed Feb. 21, 2020; the entire contents of which are incorporated herein by reference.

FIELD

An embodiment relates to an information processing apparatus, an information processing method, and a non-transitory computer readable medium.

BACKGROUND

For an operator that performs maintenance of appliances, determining a timing of performing maintenance is an important issue. For example, with printers or the like, the degree of progress of deterioration differs depending on the type of paper that is used, the frequency of use, temperature and the like. Accordingly, maintenance often unexpectedly becomes necessary before an initially planned timing. To avoid such a situation, there is much demand to grasp the degree of progress of deterioration with high accuracy and in real time.

However, a method of continually checking deterioration of an appliance using a sensor has issues in terms of cost. For example, in the case of performing maintenance of an appliance where a roller is built in as a key part, deterioration of the roller has to be grasped, and a deteriorated roller has to be replaced on a regular basis. However, a roller is a rotating body, and a sensor that is capable of directly monitoring the state of a surface of a rotating body is expensive. Accordingly, an apparatus that estimates deterioration of an appliance with high accuracy based on items that can be measured with inexpensive sensors, such as an accelerometer, is desired.

DETAILED DESCRIPTION

One embodiment of the present invention provides an apparatus and the like for improving the accuracy of deterioration estimation regarding a monitoring target.

An information processing apparatus as one embodiment of the present invention includes a detector, a separator, a calculator, and an estimator. The detector detects a normal waveform pattern included in a waveform of time-series data of a target. The separator separates the waveform of the time-series data into components while removing the normal waveform pattern that is detected. The calculator calculates a feature of the time-series data based on at least one of the components. The estimator estimates deterioration of the target based on the feature.

An embodiment will be explained in detail below with reference to the accompanying drawings. The present invention is not limited to the embodiment.

One Embodiment of Present Invention

Figure 1:
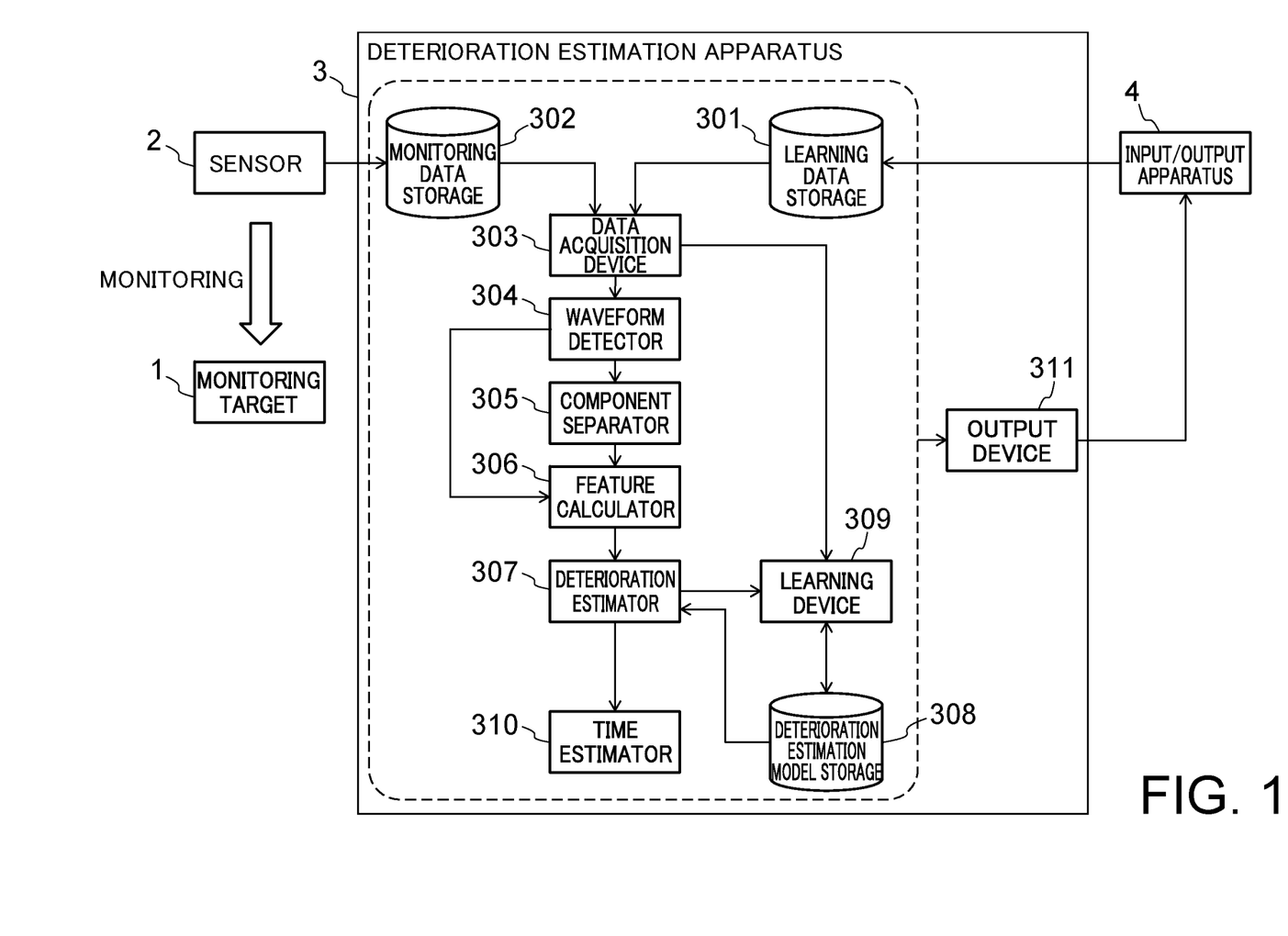
FIG. 1 is a block diagram illustrating an example of a deterioration estimation system according to one embodiment of the present invention.

FIG. 1 is a block diagram illustrating an example of a deterioration estimation system according to one embodiment of the present invention. The deterioration estimation system according to the present embodiment includes a monitoring target 1, a sensor 2, a deterioration estimation apparatus (information processing apparatus) 3, and an input/output apparatus 4. The deterioration estimation apparatus 3 includes a learning data storage 301, a monitoring data storage 302, a data acquisition device 303, a waveform detector 304, a component separator 305, a feature calculator 306, a deterioration estimator 307, a deterioration estimation model storage 308, a learning device 309, a time estimator 310, and an output device 311.

The present deterioration estimation system is a system that estimates deterioration of the monitoring target 1 based on time-series data of the monitoring target 1. In addition to estimation of deterioration at a time point in the time-series data, estimation of deterioration after the time point, or in other words, the degree of progress of deterioration, is also estimated. This enables estimation of a time point at which deterioration exceeds an allowable limit, and an operation plan may be created in relation to maintenance and the like of the monitoring target 1 based on such a time point.

The monitoring target 1 is not particularly limited. Furthermore, it suffices that the sensor 2 is capable of measuring the value of a predetermined monitoring item for the monitoring target 1. The monitoring item is not particularly limited so long as it is an item that is expected to be affected by deterioration of the monitoring target 1 and that can be measured by a known sensor 2. Additionally, there may be provided a plurality of sensors 2, and the monitoring item may be an item that can be determined from measurement values from the plurality of sensors 2. That is, a computed value based on the measurement values from the plurality of sensors 2 may be given as the value of the monitoring item. In the following, the value of the monitoring item will be referred to as a monitored value, and data about the monitoring item will be referred to as monitoring data. That is, the present deterioration estimation system collects monitoring data about the monitoring target 1 using the sensor(s) 2. Additionally, the number of monitoring items may be one or more. Furthermore, the sensor(s) 2 may be built in the monitoring target 1, or may be installed outside the monitoring target 1.

Additionally, in the present description, an appliance including a roller and a motor for driving the roller is given as a desirable example of the monitoring target 1, and the sensor 2 is assumed to be an accelerometer that measures vibration of the roller. This is because the manner of vibration of the roller changes, although subtly, according to the degree of deterioration. However, the monitoring target 1 and the sensor 2 are not limited to such examples.

Estimation of deterioration is performed by the deterioration estimation apparatus 3. The deterioration estimation apparatus 3 uses a deterioration estimation model to estimate deterioration. Details will be given together with description of an internal configuration of the deterioration estimation apparatus 3. Additionally, in the present embodiment, learning of the deterioration estimation model is also performed by the deterioration estimation apparatus 3. However, learning of the deterioration estimation model may alternatively be performed by an apparatus, not illustrated, different from the deterioration estimation apparatus 3.

The input/output apparatus 4 inputs, to the deterioration estimation apparatus 3, data to be used for learning of the deterioration estimation model. For example, learning data described later, a threshold used for determining a time, and the like are input from the input/output apparatus 4 to the deterioration estimation apparatus 3. Furthermore, the input/output apparatus 4 outputs processing results of the deterioration estimation apparatus 3, and the like.

Additionally, the apparatus and the structural elements of the deterioration estimation apparatus 3 illustrated in FIG. 1 may be separated or integrated. Furthermore, the deterioration estimation system and the deterioration estimation apparatus 3 may include structural elements not illustrated in FIG. 1. For example, the deterioration estimation system may include a learning apparatus separately from the deterioration estimation apparatus 3. Alternatively, the deterioration estimation apparatus 3 may be separated into an apparatus that detects a deterioration feature and an apparatus that performs estimation regarding deterioration. It is common to distribute processes to dedicated apparatuses in such a manner to distribute processing load and maintain availability, for example. Furthermore, for example, the deterioration estimation system may include a storage device such as a network area storage, and the monitoring data and the like may be stored in the storage device. That is, each storage of the deterioration estimation apparatus 3 may be provided outside the deterioration estimation apparatus 3. Moreover, the input/output apparatus 4 may be separated into an input device and an output device, for example.

An internal configuration of the deterioration estimation apparatus 3 will be described. In the example in FIG. 1, the learning data storage 301, the monitoring data storage 302, and the deterioration estimation model storage 308 are illustrated to help understanding of exchange of data between the structural elements. The learning data storage 301 stores learning data, the monitoring data storage 302 stores the monitoring data, and the deterioration estimation model storage 308 stores the deterioration estimation model. However, these storages do not have to be separated, and also, these storages may store other pieces of data.

The learning data includes monitoring data for learning and ground truth data. The monitoring data for learning is data that is used at the time of learning the deterioration estimation model, and is associated with the ground truth data. Actual monitoring data may be used as the monitoring data for learning, if the actual monitoring data is associated with the ground truth data. The ground truth data is data that is associated with the monitoring data for learning, and that indicates a correct answer regarding an output result of the deterioration estimation model that uses the monitoring data for learning.

Additionally, the monitoring data and the monitoring data for learning are each time-series data that includes values at a plurality of time points. For the sake of convenience, the term "time-series data" is used in a case where the monitoring data and the monitoring data for learning do not have to be distinguished from each other.

In the case where estimation of deterioration of the monitoring target 1 is to be performed, the data acquisition device 303 acquires the monitoring data from the monitoring data storage 302. In the case where learning of the deterioration estimation model is to be performed, the learning data is acquired from the learning data storage 301.

The waveform detector 304 detects a normal waveform pattern included in the waveform of the graph of time-series data acquired by the data acquisition device 303.

Figure 2:
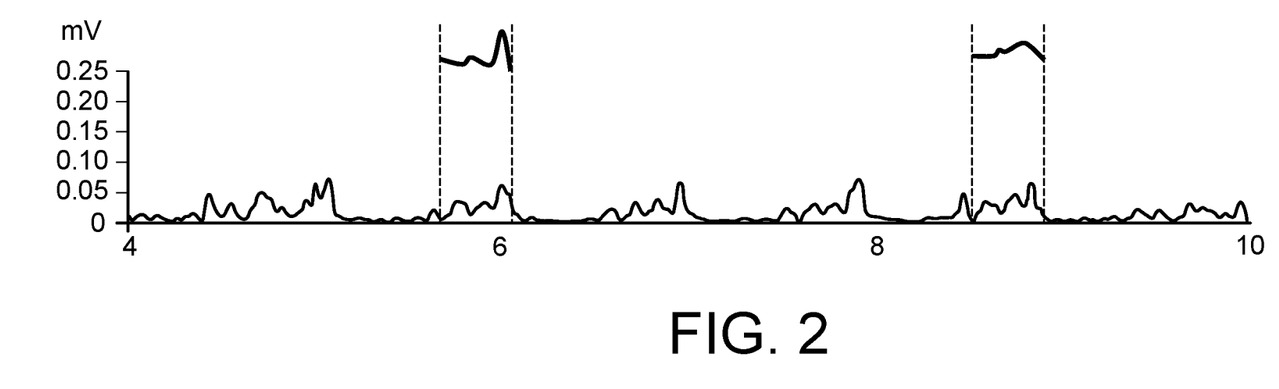
FIG. 2 is a diagram illustrating examples of a waveform of time-series data and normal waveform patterns that are detected.

FIG. 2 is a diagram illustrating examples of a waveform of the time-series data and normal waveform patterns that are detected. In the example in FIG. 2, values related to acceleration of the roller from April to October are indicated. Here, one day is taken as a unit period, and a value (representative value) in the unit period is an average value of the values in the unit period.

As illustrated in FIG. 2, the waveform of the time-series data fluctuates finely, but in the case where the appliance is normal, a normal waveform pattern (shapelet) unique to the target appliance is known to appear repeatedly in the waveform. For example, the waveform illustrated in FIG. 2 includes two normal waveform patterns, and the normal waveform patterns that are included and parts where the normal waveform patterns are included are indicated.

The waveform detector 304 compares a predetermined normal waveform pattern and the waveform of the time-series data, and specifies the part of the waveform that matches the normal waveform pattern. In relation to matching, whether a sum of absolute values of differences between each value forming the normal waveform pattern and each value of the waveform within a predetermined unit width (in other words, values of the time-series data within a predetermined unit period) is smaller than a predetermined threshold or not may be determined.

The component separator 305 removes the normal waveform pattern that is detected, from the waveform of the time-series data, and separates the waveform of the time-series data after removal of the normal waveform pattern into a trend component, a seasonal component, and a remainder component. In other words, the component separator 305 separates the waveform of the time-series data into the trend component, the seasonal component, and the remainder component while removing the detected normal waveform pattern.

The trend component is a component indicating an increase trend or a decrease trend in the waveform. For example, as the roller gradually becomes worn, paper tends to be more easily slipped at the time of paper-feeding, and vibration of the roller tends to be increased. That is, in the case where vibration of the roller is the monitoring target, the value of the monitoring data has an increase trend. The seasonal component is a component that is repeated at a specific cycle, such as four seasons, months, or weeks. Accordingly, the seasonal component takes a waveform like a sine wave. The remainder component is a component that remains after the trend component and the seasonal component are removed from the time-series data.

The feature calculator 306 calculates a feature of the time-series data based on at least one of the components of the time-series data. The feature may be an amount of increase in the trend component of the time-series data in a specified period, for example. The remainder component may also be added, for example. The feature is desirably calculated using at least the trend component such that an increase or decrease trend according to deterioration may be grasped.

The deterioration estimator 307 estimates deterioration of the monitoring target 1 based on the feature. Specifically, the feature is input to the deterioration estimation model, and an output result is obtained. In the case where the output result indicates deterioration, the output result may be used, as it is, as an estimation result. Alternatively, deterioration may be estimated based on the output result. For example, in the case where the output result is a numerical value, which of classification items "not deteriorated", "deteriorated", and "greatly deteriorated" is matched may be determined based on the numerical value.

The deterioration estimation model may be a model such as seasonal autoregressive integrated moving average model (SARIMA) or SARIMA with exogenous repressors model (SARIMAX) that are known as an estimation model for time-series data. A model based on a neural network may also be used.

For example, SARIMA is a method suitable for predicting, based on highly periodic time-series data, future transition of the time-series data. However, the value of the monitoring data of the present embodiment changes due to regular maintenance and the like. Accordingly, with SARIMA, if the monitoring data is used as it is, accuracy of deterioration estimation is reduced. Therefore, by calculating the feature after removing the normal waveform pattern from the monitoring data, as in the present embodiment, accuracy of deterioration estimation may be increased even with SARIMA or the like.

Furthermore, an estimation model that uses dynamic time warping (DTW) or k-nearest neighbor, or a non-time-series regression model such as a support vector machine (SVR) may be used in combination. For example, it is possible that the peak at a part of a waveform is slightly temporally shifted on a time axis. Accordingly, the DTW may be used in determining the degree of deterioration and whether waveforms are similar albeit with a shifted periodicity may be determined so as not to unnecessarily increase the degree of deterioration.

The learning device 309 proceeds with learning of the deterioration estimation model by updating a parameter of the deterioration estimation model based on a value output from the estimation model and the ground truth data. Learning may be performed by a general learning method. By proceeding with learning, a parameter of the deterioration estimation model is updated such that a difference between an output result obtained by input of the monitoring data for learning and the ground truth data is reduced.

Figure 3:
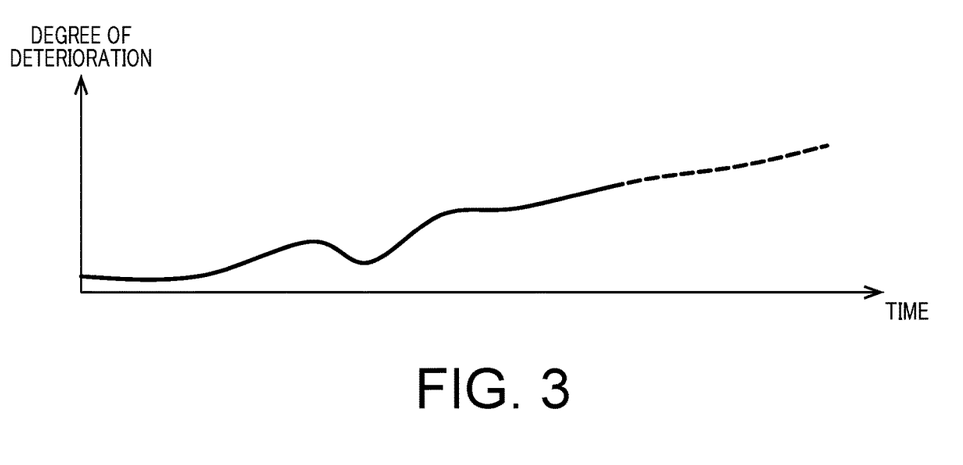
FIG. 3 is a diagram illustrating an example of a deterioration estimation result.

FIG. 3 is a diagram illustrating an example of a deterioration estimation result. A solid line part in the graph illustrated in FIG. 3 indicates the degree of deterioration at a time point in the time-series data. A dotted line part in the graph illustrated in FIG. 3 indicates the degree of deterioration at a time point after a time point in the time-series data. That is, the dotted line part indicates a predicted degree of deterioration.

The time estimator 310 estimates a time when a predetermined condition will be satisfied, based on predicted deterioration at a time point after a time point in the time-series data as illustrated in FIG. 3. For example, it is assumed that maintenance is determined to be performed at a time point when a predetermined threshold (allowable limit) is exceeded. In this case, a time point at an intersection between the dotted line in FIG. 3 and the predetermined threshold is determined to be the timing of performing maintenance. In this manner, the time estimator 310 may determine the time of performing a process on the monitoring target 1.

The output device 311 outputs a processing result of each structural element of the deterioration estimation apparatus 3 to the input/output apparatus 4. An output format of the output device 311 may be changed according to the input/output apparatus 4. For example, the output device 311 may output an image collecting processing results, or may output a file in which a processing result is written.

Figure 4:
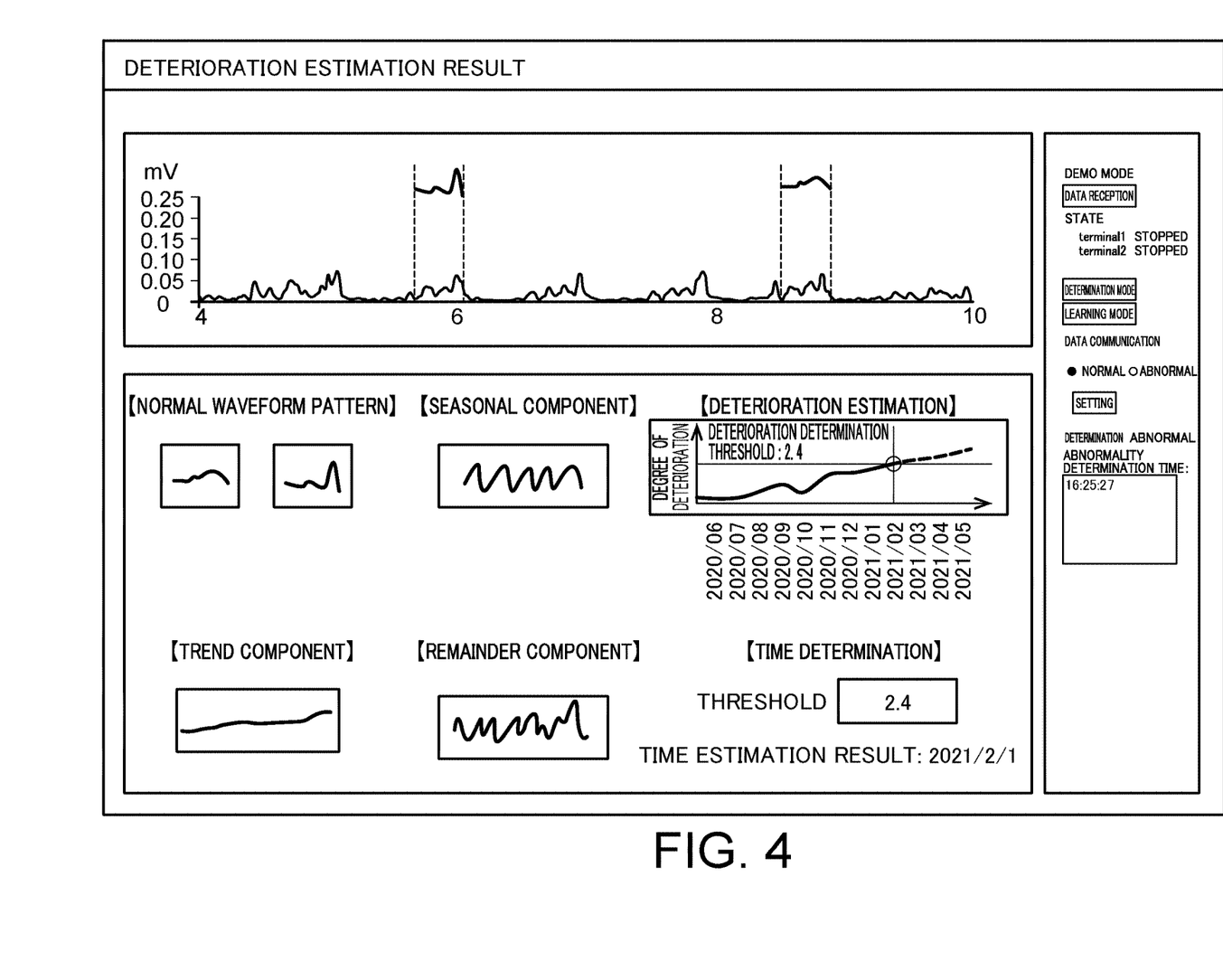
FIG. 4 is a diagram illustrating an example of an output result.

FIG. 4 is a diagram illustrating an example of the output result. For example, processing results of the structural elements of the deterioration estimation apparatus 3 may be expressed as illustrated in FIG. 4, using a Web page that can be viewed by a Web browser.

The waveform of the time-series data and the detected normal waveform patterns illustrated in FIG. 2 are indicated on an upper side in FIG. 4. Results calculated based on the waveform of the time-series data on the upper side are indicated on a lower side in FIG. 4. It is indicated by the detection result for the normal waveform pattern that two types of normal waveform patterns are included in the time-series data on the upper side. Furthermore, as component separation results for the time-series data on the upper side, shapes of the seasonal component, the trend component, and the remainder component are indicated. Furthermore, as a deterioration estimation result, an estimation graph is indicated. Moreover, as a result of time estimation, a specified threshold (allowable limit) and a date when the threshold is assumed to be reached are indicated. Additionally, the section where the threshold is indicated may be created as an input form of the Web page, and acquisition of an input from a user may be enabled. That is, conditions necessary for processing may be input to the deterioration estimation apparatus 3 via such a Web page.

Other various pieces of information, such as a result of state determination based on the degree of deterioration, such as normal or abnormal, and the name of the monitoring target 1, may be displayed, for example.

Figure 5:
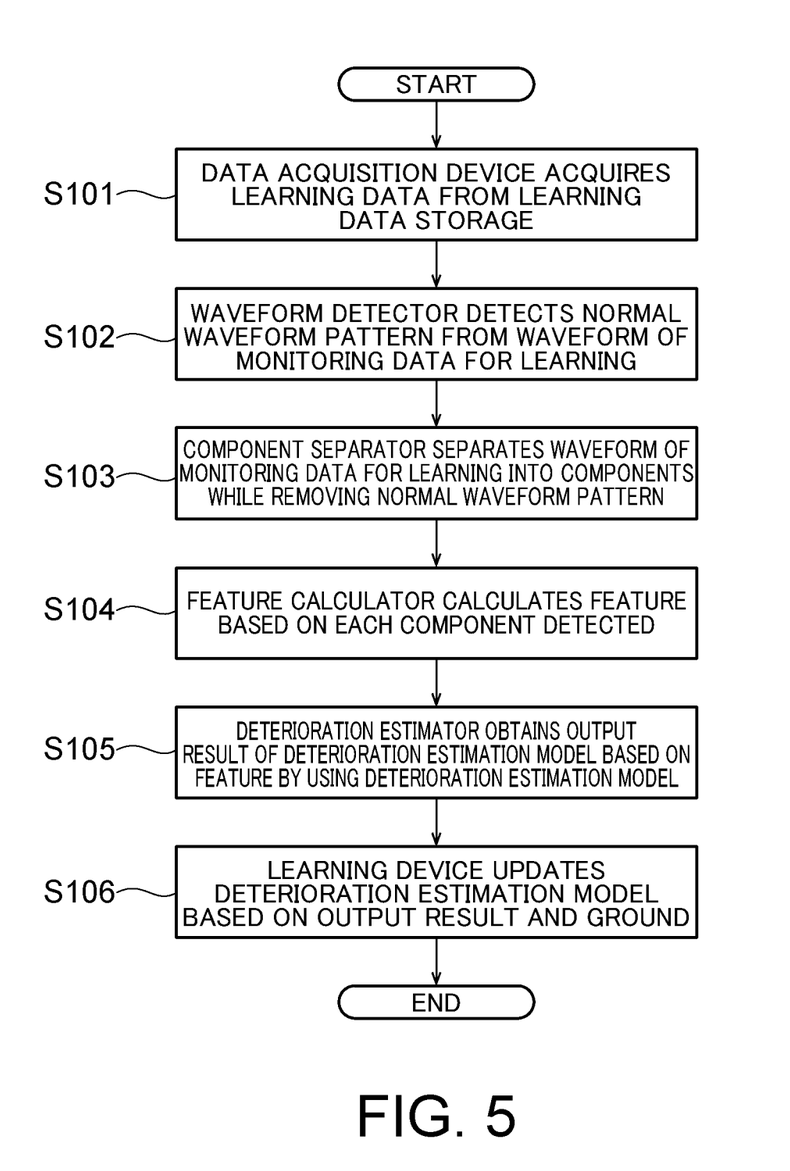
FIG. 5 is a schematic flowchart of a learning process by a deterioration estimation apparatus according to one embodiment of the present invention.

Next, a flow of processes by the structural elements will be described. FIG. 5 is a schematic flowchart of a learning process by the deterioration estimation apparatus according to one embodiment of the present invention.

The data acquisition device 303 acquires the learning data, or in other words, the monitoring data for learning and the ground truth data, from the learning data storage 301 (S101). Additionally, in the case where corresponding ground truth data is known, the actual monitoring data may be used as the monitoring data for learning. In this case, the monitoring data for learning is acquired from the monitoring data storage 302. The waveform detector 304 detects the normal waveform pattern from the waveform of the monitoring data for learning (S102). The component separator 305 separates the waveform of the monitoring data for learning into components while removing the normal waveform pattern (S103). The feature calculator 306 calculates the feature based on the components detected (S104).

The deterioration estimator 307 obtains an output result of the deterioration estimation model based on the feature by using the deterioration estimation model (S105). In the case of learning, deterioration of the monitoring target 1 does not have to be estimated. The learning device 309 updates the deterioration estimation model based on the output result and the ground truth data (S106). Learning proceeds in this manner. Additionally, in the case where there is a plurality of pieces of learning data, the present flow may be repeated from the process in S101.

Figure 6:
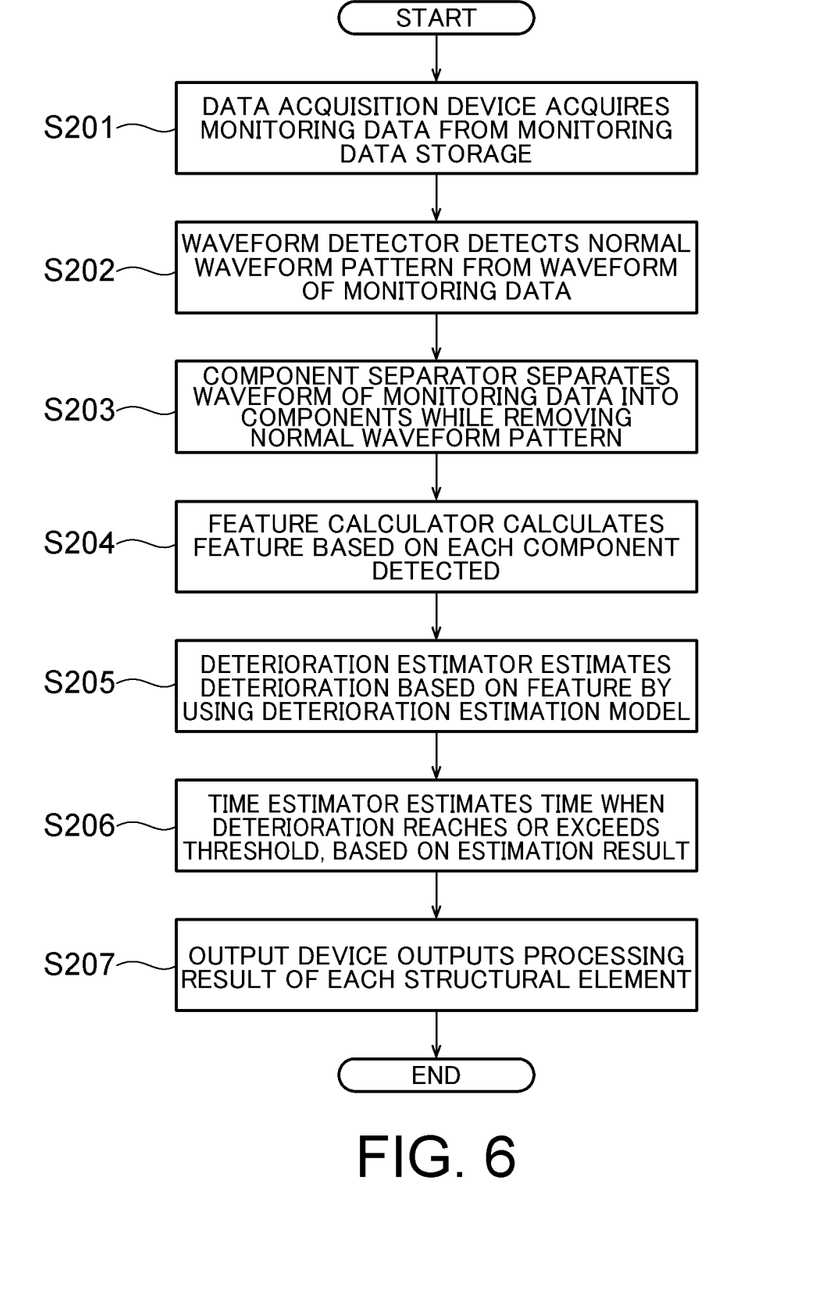
FIG. 6 is a schematic flowchart of a deterioration estimation process by the deterioration estimation apparatus according to one embodiment of the present invention.

FIG. 6 is a schematic flowchart of a deterioration estimation process by the deterioration estimation apparatus according to one embodiment of the present invention. The data acquisition device 303 acquires the monitoring data from the monitoring data storage 302 (S201). The waveform detector 304 detects the normal waveform pattern from the waveform of the monitoring data (S202). The component separator 305 separates the waveform of the monitoring data into components while removing the normal waveform pattern (S203). The feature calculator 306 calculates the feature based on the components detected (S204). Although the data used is different, processes up to this point are the same as the processes at the time of learning.

The deterioration estimator 307 estimates deterioration based on the feature by using the deterioration estimation model (S205). In the present flow, deterioration is estimated based on the output result of the deterioration estimation model. The time estimator 310 estimates a time when deterioration will reach or exceed a threshold (allowable limit), based on the estimation result (S206). The output device 311 outputs the processing result of each structural element, and the flow is ended (S207).

As described above, at the time of estimating deterioration of the monitoring target 1 based on the monitoring data using the deterioration estimation model that is learned, the deterioration estimation apparatus of the present embodiment removes the normal waveform pattern from the waveform of the monitoring data. Influence of regular maintenance and the like included in the data that is used may thereby be separated, and the accuracy of estimation of a long-term deterioration trend of the monitoring target 1 based on the data may be improved. Furthermore, an appropriate timing of maintenance may be grasped in advance, and a maintenance schedule based on the timing, or in other words, a maintenance schedule taking both the cost and availability into account, may be planned.

Additionally, at least a part of the embodiment described above may be implemented by a dedicated electronic circuit (that is, hardware) such as an integrated circuit (IC) on which a processor, a memory and the like are mounted. Furthermore, at least a part of the embodiment described above may be implemented by executing software (program). For example, processes of the embodiment described above may be implemented by using a general-purpose computer apparatus as basic hardware, and by causing a processor such as a CPU mounted in the computer apparatus to execute programs.

For example, a computer may read out dedicated software that is stored in a computer-readable storage medium to serve as an apparatus of the embodiment described above. The type of the storage medium is not particularly limited. Furthermore, dedicated software downloaded from a communication network may be installed in a computer to cause the computer to serve as an apparatus of the embodiment described above. Information processing by software is thus actually implemented using hardware resources.

Figure 7:
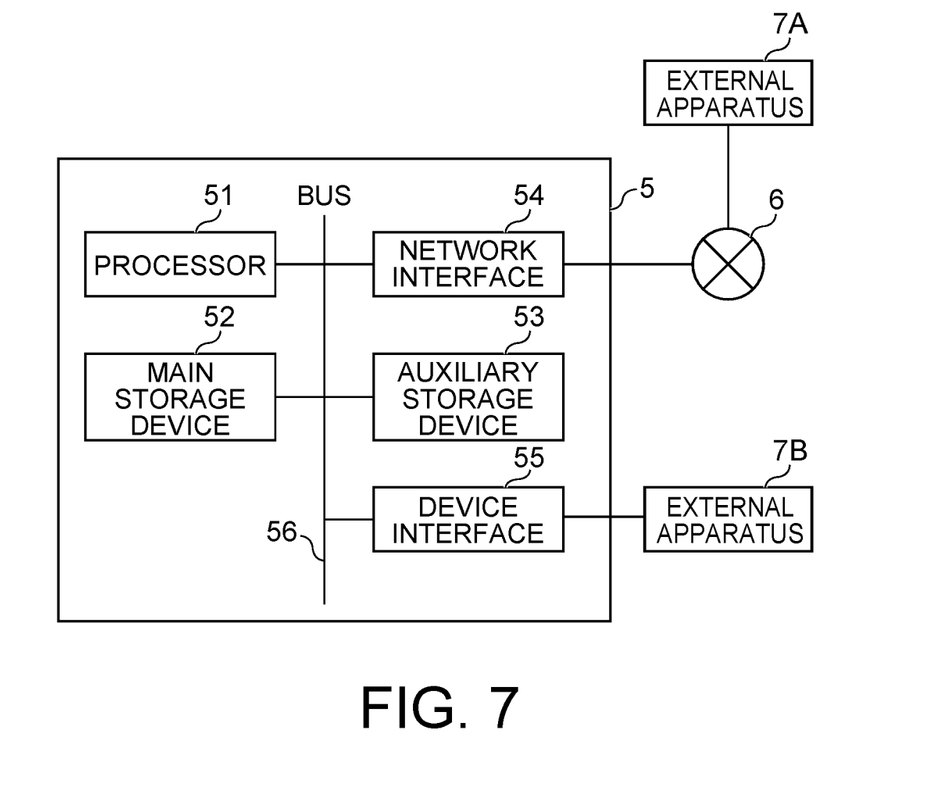
FIG. 7 is a block diagram illustrating an example of a hardware configuration according to one embodiment of the present invention.

FIG. 7 is a block diagram illustrating an example of a hardware configuration according to one embodiment of the present invention. The deterioration estimation apparatus 3 may be implemented as a computer apparatus 5 that includes a processor 51, a main storage device 52, an auxiliary storage device 53, a network interface 54, and a device interface 55, where these elements are connected via bus 56. Each storage of the deterioration estimation apparatus 3 may be implemented by the main storage device 52 or the auxiliary storage device 53, and other structural elements may be implemented by the processor 51.

Additionally, the computer apparatus 5 in FIG. 7 includes one of each structural element, but may alternatively include a plurality of same structural elements. Furthermore, FIG. 7 illustrates one computer apparatus 5, but software may be installed in a plurality of computer apparatuses, and each of the plurality of computer apparatuses may perform processing according to a different part of the software.

The processor 51 is an electronic circuit including a control device and an arithmetic device of a computer. The processor 51 performs arithmetic processing using data or a program input from each device or the like of an internal configuration of the computer apparatus 5, and outputs an arithmetic result or a control signal to each device or the like. Specifically, the processor 51 executes an operating system (OS) of the computer apparatus 5, an application or the like, and controls each device configuring the computer apparatus 5. The processor 51 is not particularly limited so long as processing described above may be performed.

The main storage device 52 is a storage device storing commands to be executed by the processor 51, various pieces of data, and the like, and information stored in the main storage device 52 is directly read out by the processor 51. The auxiliary storage device 53 is a storage device other than the main storage device 52. Additionally, these storage devices refer to any electronic components capable of storing electronic information, and may be memories or storages. Furthermore, the memory may be either of a volatile memory and a non-volatile memory.

The network interface 54 is an interface for connecting to a communication network 6 in a wireless or wired manner. As the network interface 54, one that is according to an existing communication standard may be used. Exchange of information with an external apparatus 7A that is communicatively connected via the communication network 6 may be performed by the network interface 54.

The device interface 55 is an interface, such as an USB, that is directly connected to an external apparatus 7B. The external apparatus 7B may be an external storage medium, or a storage device for a database and the like.

The external apparatuses 7A and 7B may each be an output apparatus. For example, the output apparatus may be a display apparatus for displaying images, or an apparatus for outputting sound and the like. For example, a liquid crystal display (LCD), a cathode ray tube (CRT), a plasma display panel (PDP), a speaker and the like may be cited, although these are not restrictive.

Additionally, the external apparatuses 7A and 7B may be an input apparatus. The input apparatus includes devices such as a keyboard, a mouse and a touch panel, and information input by these devices is provided to the computer apparatus 5. Signals from the input apparatus are output to the processor 51.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing apparatus comprising:
processing circuitry configured to:
detect a predetermined normal waveform pattern included in from a first waveform of time-series data acquired by a sensor on a monitoring target;
remove the predetermined normal waveform pattern from the first waveform of time-series data to obtain a second waveform of time-series data and separate the second waveform of the time-series data into a trend component that indicates an increasing or decreasing trend of the first waveform, a seasonal component that repeats in a certain cycle depending on time, and a remainder component remaining after the trend component and the seasonal component are removed from the first waveform of time series data;
calculate a feature of the time-series data based on at least one of the trend component, the seasonal component, or the remainder component; and
estimate a deterioration state of the monitoring target based on the feature.

2. The information processing apparatus according to claim 1, wherein the processing circuitry determines at least one of the trend component, the seasonal component, and the remainder component according to a monitored item among items of the monitoring target and estimates the deterioration state based on the feature calculated from the selected component.

3. The information processing apparatus according to claim 1, wherein
the processing circuitry calculates the feature at each of a plurality of time points in the time-series data, and predicts a deterioration state of the monitoring target at a time point after elapse of a time period of the time-series data based on the feature at each of the plurality of time points or estimated deterioration state at the plurality of time points, and
determine timing on when to perform maintenance of the monitoring target based on the predicted deterioration state.

4. The information processing apparatus according to claim 1, wherein
the processing circuitry calculates the feature based on the trend component when the monitoring item is a first item of the items, or calculates the feature based on the trend component and the remainder component when the monitoring item is a second item of the items.

5. The information processing apparatus according to claim 1, further comprising an output circuit configured to display the first waveform of the normal waveform pattern that is detected, and waveforms of the trend component, the seasonal component, and the remainder component that is separated, and the generated information of timing on when to perform maintenance of the monitoring target.

6. The information processing apparatus according to claim 1, wherein the processing circuitry estimates the deterioration state of the monitoring target by using an estimation model that outputs a value indicating a deterioration state of the monitoring target based on the feature input into the estimation model.

7. The information processing apparatus according to claim 6, wherein
the processing circuitry acquires ground truth data indicating a deterioration state of the monitored object during a period for which the time-series data is obtained, and updates a parameter of the estimation model based on the value output from the estimation model and the ground truth data.

8. An information processing method comprising:
detecting a predetermined normal waveform pattern from a first waveform of time-series data acquired by a sensor on a monitoring target;
removing the predetermined normal waveform pattern from the first waveform of time-series data to obtain a second waveform of time-series data and separating the second waveform of the time-series data into a trend component that indicates an increasing or decreasing trend of the first waveform, a seasonal component that repeats in a certain cycle depending on time, and a remainder component remaining after the trend component and the seasonal component are removed from the first waveform of time series data;
calculating a feature of the time-series data based on at least one of the the trend component, the seasonal component, or the remainder component;
estimating a deterioration state of the monitoring target based on the feature; and
generating information of timing on when to perform maintenance of the monitoring target based on the estimated deterioration state.

9. A non-transitory computer readable medium storing a program comprising executable instructions that, when executed by a compute processor, the processor performs steps including:
detecting a predetermined normal waveform pattern from a first waveform of time-series data acquired by a sensor on a monitoring target;
removing the predetermined normal waveform pattern from the first waveform of time-series data to obtain a second waveform of time-series data and separating the second waveform of the time-series data into a trend component that indicates an increasing or decreasing trend of the first waveform, a seasonal component that repeats in a certain cycle depending on time, and a remainder component remaining after the trend component and the seasonal component are removed from the first waveform of time series data;
calculating a feature of the time-series data based on at least one of the the trend component, the seasonal component or the remainder component;
estimating a deterioration state of the monitoring target based on the feature; and
generating information of timing on when to perform maintenance of the monitoring target based on the estimated deterioration state.

* * * * *

UNITED STATES PATENT AND TRADEMARK OFFICE
CERTIFICATE OF CORRECTION

PATENT NO. : 11,598,693 B2  
APPLICATION NO. : 17/015339  
DATED : March 7, 2023  
INVENTOR(S) : Ken Ueno Page 1 of 1

It is certified that error appears in the above-identified patent and that said Letters Patent is hereby corrected as shown below:

In the Claims

In Claim 1, Column 9, Lines 7-8, "waveform pattern included in from a first waveform" should read --waveform pattern from a first waveform--.

In Claim 1, Column 9, Line 19, "time series data;" should read --time-series data;--.

In Claim 8, Column 10, Line 26, "time series data;" should read --time-series data;--.

In Claim 8, Column 10, Line 28, "of the the trend" should read --of the trend--.

In Claim 9, Column 10, Line 37, "compute processor," should read --computer processor,--.

In Claim 9, Column 10, Line 51, "time series data;" should read --time-series data;--.

In Claim 9, Column 10, Line 53, "of the the trend" should read --of the trend--.

Signed and Sealed this  
Twenty-second Day of August, 2023

Katherine Kelly Vidal  
*Director of the United States Patent and Trademark Office*